United States Patent [19]

Evans

[11] 3,807,515
[45] Apr. 30, 1974

[54] MINING DRILL

[75] Inventor: Lewis Graham Evans, Lexington, Ky.

[73] Assignee: Fansteel, Inc., North Chicago, Ill.

[22] Filed: Nov. 2, 1972

[21] Appl. No.: 303,130

[52] U.S. Cl. .............................................. 175/410
[51] Int. Cl. ........................................... E21c 13/00
[58] Field of Search ............ 175/410, 411, 412, 413

[56] References Cited
UNITED STATES PATENTS

| | | | |
|---|---|---|---|
| 2,735,656 | 2/1956 | Hoglund et al. | 175/410 |
| 3,049,033 | 8/1962 | Benjamin et al. | 175/410 |
| 2,784,943 | 3/1957 | Bylund | 175/410 |
| 2,101,376 | 12/1937 | Voigtlander | 175/411 |
| 3,080,009 | 3/1963 | Baker | 175/410 |

Primary Examiner—Henry C. Sutherland
Assistant Examiner—Richard E. Favreau
Attorney, Agent, or Firm—Barnes, Kisselle, Raisch & Choate

[57] ABSTRACT

A mining drill of the type having a slotted head with a brazed insert wherein an arcuate surface is provided in the mating surfaces of the slot and the insert together with additional side thrust surfaces to hold the insert well centered during manufacture and use.

4 Claims, 3 Drawing Figures

MINING DRILL

This invention relates to a rotary cutting tool and more particularly to a rotary roof drill which is used primarily for coal mining.

One of the problems in connection with two-piece bits, that is, a bit holder and a cutter insert, has been the centering of the bit within the holder since a very accurate hole is desired; and it is important that the tranverse cutting insert be accurately located relative to the rotating head.

It is an object of the present invention to provide a bit design which assists in the locating of the carbide insert during manufacture and also during the operation. This is accomplished by providing a contoured slot base in the bit head which has a complemental surface on the insert to locate the insert accurately.

It is a further object to provide a construction which is easily manufactured so that the cost of the bit may be kept at a minimum.

Other objects and features of the construction will be apparent in the following description and claims in which the principles of operation are set forth together with the mode presently contemplated for carrying out the invention.

Figure 1:
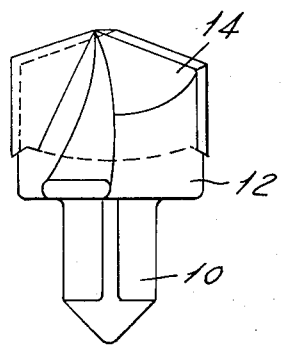

Drawings accompany the disclosure and the various views thereof may be briefly described as:

FIG. 1, a side elevation of a mining bit.

Figure 2:
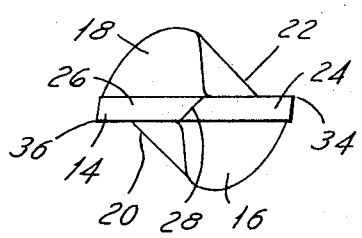

FIG. 2, an end elevation of the bit.

Figure 3:
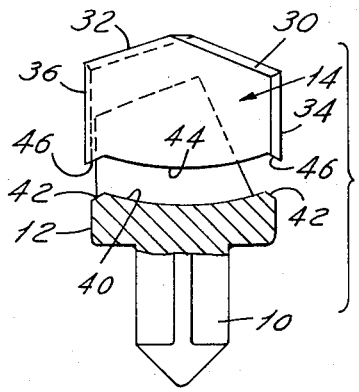

FIG. 3, a sectional view showing the details of the parts prior to assembly.

Referring to the drawings:

A mining bit is shown in FIG. 1 having a drive shank 10, a rotating head 12 to rotate about a centerline of the bit, a cutting insert 14. The cutting head is formed in such a way that the sides 16 and 18 project only part way across the diameter to provide openings 20 and 22 for cutting clearance. The cutting insert has angled cutting edges 24 and 26 meeting at an angle apex 28 with respective cutting edges 30 and 32. The side cutting edges 34 and 36 are angled to provide working clearance.

It is important that the insert 30 be accurately located relative to the centerline of rotation of the shank 10 and the head 12.

As shown in FIG. 3, the base of the slot, which extends diametrically across the head, is arcuate at the center portion 40 extending most of the distance across the head and curved around a center lying on the centerline of rotation. Each end of the arc is provided with a surface 42 which is angled away from the tangent of the arc 40 at each end in a direction away from the center of the arc. This base of the slot may be formed by a milling wheel operating on the forged or cast bit which is suitably mounted in fixtures so that the center of the arc 40 can be exactly on the axis of rotation. The end surfaces 24 can also be milled at each end of the arc in a suitable fixture.

The insert 14 can be formed into the shape shown in FIG. 3 so that it has a convex bottom surface 44 with angled surfaces 46 so that the bottom of the insert 14 is complemental to the bottom of the slot in the drill head. When the parts are assembled, these respective surfaces will lie in juxtaposition and locate accurately relative to each other. The insert is preferably brazed into position and thus the cutting edges 34 and 36 will be equidistant from the center of rotation. This locating function also strengthens the unit as it is being used. Should the braze soften at a high speed operation, the bit will remain centered because of the axial pressure driving the parts together and retaining them in the relative position with respect to the center.

I claim:

1. In a milling drill, that improvement which comprises:

a. a body having a shank at one end to be mounted for rotation of said drill about an axis of rotation and having a rotatable head at the other end slotted diametrically, said slot having a base and parallel sidewalls rising from said base to the working end of the head, said base having an arcuate contour surface curved on a center lying on said axis of rotation and terminating at each end in a surface nonparallel to said axis of rotation and inclined to the tangent of said arcuate contour surface at said respective ends thereof, b. an insert of hard cutting material lodged in said slot and having a bottom arcuate contour surface terminating at each end in a bottom surface nonparallel to said axis of rotation and inclined to the tangent of siad bottom arcuate contour surface at said respective ends thereof, said bottom arcuate contour and inclined surfaces being complemental to the arcuate contour and inclined surfaces respectively of said base of said slot, said insert having sides to lie adjacent said slot sides, said insert projecting axially above said slot to receive axial forces and having side edges to project beyond said slot radially an equal distance from said centerline, and c. brazing material fixing said insert to said body with said insert received in said slot with said arcuate contour and inclined surfaces of said bottom of said insert and base of said slot in juxtaposition, whereby said insert is fixedly mounted in said body on the axis of rotation of said shank.

2. A mining drill as defined in claim 1 wherein said surfaces of said base inclined to the tangent of said arcuate contour surface thereof are each angled away from their respective tangents in a direction away from the center of said arcuate contour surface of said base.

3. A mining drill as defined in claim 1 wherein said arcuate contour surface of said base of said slot is concave and said bottom arcuate contour surface of said insert is convex.

4. A mining drill as defined in claim 3 wherein said surfaces of said base inclined to the tangent of said arcuate contour surface thereof are each angled away from their respective tangents in a direction away from the center of said arcuate contour surface of said base.

* * * * *